United States Patent [19]

Sjoberg

[11] 4,180,097

[45] Dec. 25, 1979

[54] MUD PUMP VALVE

[75] Inventor: James G. Sjoberg, Humble, Tex.

[73] Assignee: Chromalloy American Corporation, St. Louis, Mo.

[21] Appl. No.: 957,105

[22] Filed: Nov. 2, 1978

[51] Int. Cl.$^2$ .................. F16K 15/06; F16K 1/38
[52] U.S. Cl. .................. 137/516.29; 137/DIG. 3
[58] Field of Search .................. 137/516.29, DIG. 3; 251/332

[56] References Cited

U.S. PATENT DOCUMENTS

| | | | |
|---|---|---|---|
| 3,057,372 | 10/1962 | Sutton et al. | 137/516.29 |
| 3,191,617 | 6/1965 | Maddox | 137/516.29 |
| 3,409,039 | 11/1968 | Griffin | 137/516.29 |
| 3,742,976 | 7/1973 | Bailey | 137/516.29 |
| 4,076,212 | 2/1978 | Leman | 137/516.29 |

*Primary Examiner*—William R. Cline

[57] ABSTRACT

A mud pump valve including a seat ring having an upwardly facing frusto-conical seating surface and a generally flat closure disc having a downwardly facing frusto-conical seating surface at the lower end thereof. The disc has a groove around the periphery thereof, with the groove having a cross section that includes a flat first side substantially parallel to the plane of the disc, a flat second side at right angles to and extending downwardly from the first side, and a flat third side adjacent and at an angle greater than 90° to the second side. The valve further includes an insert ring contained within the groove having an internal cross section generally congruent to the cross section of the groove except that the width of the first side of the insert is less than the width of the first side of the groove. The insert also includes a fourth side extending outwardly and upwardly at an angle greater than that of the seating surface. The valve also includes a stem attached through the center of the disc.

2 Claims, 2 Drawing Figures

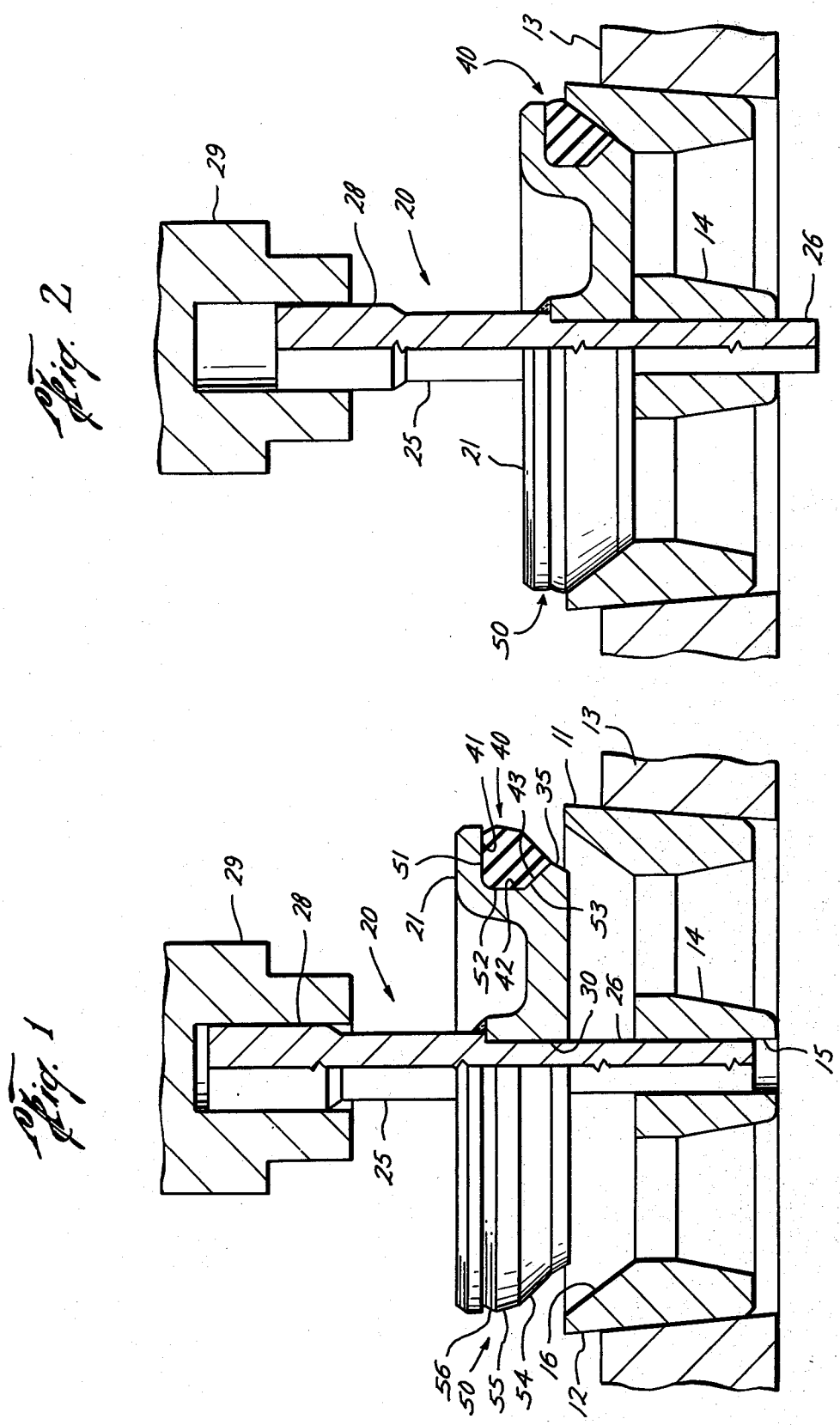

MUD PUMP VALVE

BACKGROUND OF THE INVENTION

A. Field of the Invention

This invention relates to valves and more particularly to valves for mud pumps.

B. Description of the Prior Art

During the drilling of oil and gas wells, drilling fluids are circulated within the bore hole by means of positive displacement pumps commonly called mud pumps. The inlet and outlet ports of mud pumps are provided with poppet type valves, which include a seat ring and a valve disc adapted for reciprocal motion with respect to the seat ring. The disc also includes an elastomer insert snap fitted into a groove around the periphery of the disc. The disc also includes a unitary upper and lower guide stem.

The life of mud pump valves is limited by the life of the insert. In prior art valves, the groove is of a circular cross section or includes a round bottom. The insert is conformed to fit to the contours of the groove and is normally in the shape of an O-ring. During opening and closing of the valve, these O-ring inserts are subject to twisting, which causes fatigue and eventual destruction of the ring. Also, abrasive solids become trapped between the groove and the insert, further shortening the life of the insert. Additionally, as the insert is compressed upon closure of the valve, portions of the insert are extruded beyond the limits of the groove causing an additional area of fatigue. A further shortcoming of the heretofore existing valves is in the unitary construction of the valve disc and stems. It is expensive to fabricate such structures. Moreover, different mud pumps have different dimensions, which require valves with stems of different lengths and diameters.

SUMMARY OF THE INVENTION

It is, therefore, an object of the present invention to provide a mud pump valve that has an insert that is resistant to twisting and extrusion beyond the limits of the groove that contains it, and that prevents the entry of solids between the insert and the groove. It is a further objective of the present invention to provide a mud pump valve with an interchangeable stem.

Briefly stated, the valve of the present invention includes a seat ring adapted for insertion in the mud pump and a disc member mounted for reciprocal movement with respect to the seat ring between an open position and a closed position. The seat ring includes an upwardly facing frusto-conical seating surface on the interior thereof, and a lower stem guide supported by webs or the like.

The disc includes a downwardly facing frusto-conical seating surface at the lower end thereof, which is engageable with the seating surface of the seat ring. The disc also includes a three-sided groove around the periphere thereof above the seating surface. The groove includes a first flat side substantially parallel to the plane of the disc, a second flat side extending downwardly from the first side at an angle substantially equal to 90° and a flat third side extending outwardly from the second side at an angle greater than 90° to intersect the seating surface.

Contained within the groove is an insert ring having a cross section which includes a first flat side substantially parallel to the plane of the insert and having a width less than the width of the first side of the groove so that the material of the insert does not extrude beyond the first side of the groove upon compresssion thereof. The insert includes second and third sides which are congruent to the second and third sides of the groove respectively. The insert further includes a fourth side adjacent to the third side thereof and the seating surface of the disc, which extends outwardly and upwardly at an angle greater than that of the seating surface, such that the insert contacts the seating surface of the seating ring first upon closure.

The valve also includes a one piece valve stem which is attached be welding or the like through the center of the disc so as to be interchangeable.

BRIEF DESCRIPTION OF THE DRAWINGS

FIG. 1 is a partial sectional view of the valve of the present invention in the open position.

FIG. 2 is a partial sectional view of the valve of the present invention in the closed position.

DESCRIPTION OF THE PREFERRED EMBODIMENT

Referring now to the drawings, the valve of the present invention includes a seat ring 11 and a closure member, designated generally by the numeral 20. Seat ring 11 has a frustro-conically tapered outer surface 12 adapted for insertion into valve deck 13 of the mud pump. At the center of seat ring 11, supported by webs or the like (not shown) is a lower stem guide 14 having a central bushing 15 extending therethrough. Seat ring 11 has on the interior thereof an upwardly facing frustro-conical seating surface 16.

Closure member 20 is comprised generally of a disc 21 and a valve stem 25. Valve stem 25 has a lower portion 26 having a diameter slightly smaller than the diameter of central bushing 15 of lower stem guide 14. Valve stem 25 also has an upper portion 28 having a diameter slightly smaller than the internal diameter of upper stem guide 29, which is a part of the mud pump. The length and diameter of upper portion 28 may be of various sizes in order to accommodate mud pumps of different sizes. Valve stem 25 is inserted through a hole 30 at the center of disc 21 and fixed in place, as by welding or the like.

Disc 21 has at the lower end thereof a downwardly facing frustro-conical seating surface 35. Seating surface 35 has a pitch substantially equal to seating surface 16 of seat ring 11 in order to form a metal to metal seal when the valve of the present invention is in the closed position, as shown in FIG. 2.

Above seating surface 35 is a three-sided groove, designated generally by the numeral 40. Groove 40 includes a flat first side 41, which is substantially parallel to the plane of disc 21. Groove 40 also includes a flat second side 42 adjacent to first side 41 and extending downwardly therefrom. Groove 40 further includes a flat third side 43 adjacent to and extending outwardly from second side 42 at an angle greater than 90°.

Groove 40 has contained therein an elastomeric insert ring 50. Insert ring 50 has a flat first side substantially parallel to the plane thereof and having a width less than the width of first side 41 of groove 40. The width of side 50 is less than that of side 41 so that when insert 50 is compressed, the material thereof will not extrude beyond the limits of groove 40 and thereby be subject to fatigue.

Insert ring 50 also includes a flat second side 52 adjacent to and extending downwardly from first side 51 at an angle substantially equal to 90°. Second side 52 is of a width substantially equal to that of second side 42 of groove 40. Insert ring 50 also has a flat third side 53 adjacent to and extending outwardly from second side 52 at an angle substantially equal to the angle between second side 42 and third side 43 of groove 40. The width of side 53 is substantially equal to the width of third side 43 of groove 40.

Insert ring 50 also includes a fourth side 54 which extends upwardly and outwardly from seating surface 35 of disc 21. The pitch of side 54 is greater than that of seating surface 35 so that as closure member 20 moves into engagement with seating surface 16 of seat ring 11, the first contact between closure member 20 and seating surface 16 is with insert ring 50 rather than with seating surface 35.

Insert ring 50 also includes a fifth side 55 and sixth side 56. Fifth side 55 is adjacent to and above fourth side 54. Sixth side 56 extends between fifth side 55 and first side 51. The cross section of insert ring 50 is such that when closure member 20 is in the closed position, as shown in FIG. 2, no part thereof is extruded beyond first side 41 of groove 40 or above the upper portion of seating surface 16. Additionally, the three sided cross section of groove 40 and the internal structure of insert ring 50 make insert ring 50 resistant to twisting as closure member 20 opens and closes, thereby making insert ring 50 less vulnerable to fatigue. Moreover, as closure member 20 closes, seating surface 16 of seat ring 11 compresses insert ring 50 and forces sides 51, 52 and 53 tightly into groove 40 to keep solids from entering therebetween.

It can thus be seen that valve of the present invention overcomes the shortcomings of the prior art.

What is claimed is:

1. A mud pump valve, which comprises:

a seat ring adapted for insertion in said mud pump, said seat ring including an upwardly facing frustro-conical seating surface on the interior thereof;

a generally flat closure disc having a downwardly facing frustro-conical seating surface at the lower end thereof, said seating surface being engageable with said seating surface of said seat ring, said closure disc also having a groove around the periphery thereof above said seating surface thereof, said groove having a cross-section which includes a flat first side substantially parallel to the plane of said disc, a flat second side at a right angle to and extending downwardly from said first side, and a flat third side adjacent and at an angle greater than 90° to said second side and adjacent to said seating surface of said disc;

and an insert ring contained within said groove, said insert ring having a cross-section which includes a flat first side substantially parallel to the plane thereof and of a width less than the width of said first side of said groove, a flat second side adjacent and at a right angle to said first side and of a width equal to said second side of said groove, and a flat third side adjacent and at an angle greater than 90° to said second side and of a width equal to said third side of said groove, and said cross-section of said insert ring further including a fourth side adjacent to said third side of said insert, said fourth side also being adjacent to said seating surface of said disc and extending outwardly and upwardly at an angle greater than that of said seating surface, wherein the cross-sectional area of said insert ring is sized such that no part thereof is extruded outwardly of said first side of said groove;

and means for mounting said disc for reciprocal motion with respect to said seat ring between an open position and a closed position.

2. The mud pump valve as claimed in claim 2, wherein said mounting means includes:

a stem guide supported by said seat ring; and a stem attached through the centers of said disc.

* * * * *